US010321324B2

(12) United States Patent
Feng et al.

(10) Patent No.: US 10,321,324 B2
(45) Date of Patent: Jun. 11, 2019

(54) NETWORK RESOURCE ALLOCATION METHOD AND APPARATUS, AND BASE STATION

(71) Applicant: Huawei Technologies Co., Ltd., Shenzhen, Guangdong (CN)

(72) Inventors: Huijuan Feng, Chengdu (CN); Xin Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/728,239

(22) Filed: Oct. 9, 2017

(65) Prior Publication Data

US 2018/0035299 A1  Feb. 1, 2018

Related U.S. Application Data

(63) Continuation of application No. PCT/CN2015/076258, filed on Apr. 10, 2015.

(51) Int. Cl.
*H04W 16/04* (2009.01)
*H04W 16/10* (2009.01)
(Continued)

(52) U.S. Cl.
CPC .......... *H04W 16/10* (2013.01); *H04L 1/0003* (2013.01); *H04L 5/0057* (2013.01); *H04W 16/04* (2013.01);
(Continued)

(58) Field of Classification Search
CPC ... H04L 1/0026; H04L 1/0003; H04L 1/0007; H04W 72/1289; H04W 88/08; H04W 16/10; H04W 24/02; H04W 52/262; H04W 52/346; H04W 72/1231
See application file for complete search history.

(56) References Cited

U.S. PATENT DOCUMENTS

2010/0062782 A1* 3/2010 Higuchi ............... H04L 1/0007
455/450
2012/0120881 A1* 5/2012 Kalhan ............... H04L 5/0007
370/329
(Continued)

FOREIGN PATENT DOCUMENTS

CN 101374018 A 2/2009
CN 102130749 A 7/2011
(Continued)

OTHER PUBLICATIONS

"3rd Generation Partnership Project; Technical Specification Group Radio Access Network; Evolved Universal Terrestrial Radio Access (E-UTFtA); Radio Resource Control (RRC); Protocol specification (Release 12)", 3GPP TS 36.331 VI 2.5.0 (Mar. 2015), 445 page.*
(Continued)

*Primary Examiner* — George Eng
*Assistant Examiner* — Umair Ahsan (57) ABSTRACT

The present disclosure discloses a network resource allocation method and apparatus, and a base station, pertaining to the wireless communications field. The method includes: receiving, by an evolved NodeB (eNB), a channel quality indicator (CQI) sent by a terminal; obtaining, by the eNB, a first modulation and coding scheme (MCS) of the terminal according to the CQI; allocating, by the eNB according to an amount of to-be-transmitted data and the first MCS, to the terminal a first resource block (RB) set required for transmitting the to-be-transmitted data; and adjusting, by the eNB, the first RB set according to a service type of the to-be-transmitted data and the first MCS.

14 Claims, 3 Drawing Sheets

(51) Int. Cl.
*H04W 52/26* (2009.01)
*H04W 72/12* (2009.01)
*H04L 1/00* (2006.01)
*H04L 5/00* (2006.01)
H04W 88/08 (2009.01)
H04B 7/0413 (2017.01)

(52) U.S. Cl.
CPC ..... *H04W 52/262* (2013.01); *H04W 72/1273* (2013.01); *H04B 7/0413* (2013.01); *H04W 88/08* (2013.01)

(56) References Cited

U.S. PATENT DOCUMENTS

2012/0327884 A1 12/2012 Seo et al.
2013/0294247 A1* 11/2013 Zhu .................. H04W 72/0486
370/235
2018/0070306 A1* 3/2018 Ang ................. H04W 52/0219

FOREIGN PATENT DOCUMENTS

| CN | 102724016 A | 10/2012 |
|---|---|---|
| EP | 2034760 A1 | 3/2009 |
| EP | 2654358 A1 | 10/2013 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.5.0 (Mar. 2015), 445 pages.

* cited by examiner

NETWORK RESOURCE ALLOCATION METHOD AND APPARATUS, AND BASE STATION

CROSS-REFERENCE TO RELATED APPLICATIONS

This application is a continuation of International Application No. PCT/CN2015/076258, filed on Apr. 10, 2015, the disclosure of which is hereby incorporated by reference in its entirety.

TECHNICAL FIELD

The present application relates to the wireless communications field, and in particular, to a network resource allocation method and apparatus, and a base station.

BACKGROUND

In a long term evolution (LTE) system, when a terminal obtains data from an evolved NodeB (eNB) that the terminal accesses, the eNB needs to allocate a network resource to the terminal. The base station sends the data to the terminal by using the network resource, and the network resource is a resource required for transmitting data between the terminal and the eNB. For example, the network resource may be transmit power or a resource block (RB).

The prior art provides a network resource allocation method, and the method may be as follows: A base station obtains a quantity of RBs included in a cell that a terminal accesses, and equally allocates transmit power corresponding to the cell to RBs according to the quantity of RBs. The base station obtains an amount of to-be-transmitted data of the terminal and a modulation and coding scheme (MCS) of the terminal, obtains, according to the amount of the to-be-transmitted data and the MCS, a quantity of RBs required for transmitting the to-be-transmitted data from a correspondence among a data amount, an MCS, and a quantity of RBs, and allocates the terminal RBs whose quantity is equal to the quantity of RBs required for transmitting the to-be-transmitted data.

The prior art has at least the following disadvantages:

Service types of to-be-transmitted data on terminals are different, and different service types require different transmit power of each RB. In the prior art, the transmit power corresponding to the cell is equally allocated to RBs, and this may lead to inefficiency in transmitting the to-be-transmitted data.

SUMMARY

To resolve the problem in the prior art, the present disclosure provides a network resource allocation method and apparatus, and a base station. Technical solutions are as follows:

According to a first aspect, the present disclosure provides a network resource allocation method, where the method includes:

receiving, by an evolved NodeB eNB, a channel quality indicator CQI sent by a terminal;

obtaining, by the eNB, a first MCS of the terminal according to the CQI;

allocating, by the eNB according to an amount of to-be-transmitted data and the first MCS, to the terminal a first resource block RB set required for transmitting the to-be-transmitted data; and adjusting, by the eNB, the first RB set according to a service type of the to-be-transmitted data and the first MCS.

With reference to the first aspect, in a first possible implementation of the first aspect, the adjusting, by the eNB, the first RB set according to a service type of the to-be-transmitted data and the first MCS includes:

when the service type of the to-be-transmitted data is a voice service type and the first MCS is within a first preset range, obtaining, by the eNB, transmit power of an idle RB in a cell that the terminal accesses; and increasing, by the eNB, transmit power of each RB in the first RB set according to the transmit power of the idle RB.

With reference to the first possible implementation of the first aspect, in a second possible implementation of the first aspect, the increasing, by the eNB, transmit power of each RB in the first RB set according to the transmit power of the idle RB includes:

equally allocating, by the eNB, a preset value to the RBs in the first RB set if the transmit power of the idle RB is greater than the preset value; or equally allocating, by the eNB, the transmit power of the idle RB to the RBs in the first RB set if the transmit power of the idle RB is not greater than a preset value.

With reference to the first aspect, in a third possible implementation of the first aspect, the adjusting, by the eNB, the first RB set according to a service type of the to-be-transmitted data and the first MCS includes:

when the service type of the to-be-transmitted data is a data service type, adjusting, by the eNB according to the first MCS, a quantity of RBs included in the first RB set to obtain multiple second RB sets, where a sum of transmit power of RBs in the first RB set is equal to a sum of transmit power of RBs in each second RB set of the multiple second RB sets;

separately calculating, by the eNB, a throughput of the terminal in each second RB set; and adjusting, by the eNB, the first RB set according to a second RB set corresponding to a maximum throughput.

With reference to the third possible implementation of the first aspect, in a fourth possible implementation of the first aspect, the adjusting, by the eNB according to the first MCS, a quantity of RBs included in the first RB set to obtain multiple second RB sets includes:

if the first MCS is within a second preset range, reducing, by the eNB, the quantity of RBs included in the first RB set to obtain multiple second RB sets; or if the first MCS is within a third preset range, increasing, by the eNB, the quantity of RBs included in the first RB set to obtain multiple second RB sets.

With reference to the third possible implementation of the first aspect, in a fifth possible implementation of the first aspect, the separately calculating, by the eNB, a throughput of the terminal in each second RB set includes:

separately calculating, by the eNB according to the first MCS, transmit power of each RB in each second RB set, and transmit power of each RB in the first RB set, a second MCS corresponding to each second RB set; and separately calculating, by the eNB, the throughput of the terminal in each second RB set according to each second RB set and the second MCS corresponding to each second RB set.

With reference to the third possible implementation of the first aspect, in a sixth possible implementation of the first aspect, the adjusting, by the eNB, the first RB set according to a second RB set corresponding to a maximum throughput includes:

obtaining, by the eNB, the second RB set corresponding to the maximum throughput; and adjusting, by the eNB, the first RB set to the second RB set corresponding to the maximum throughput.

With reference to the fourth possible implementation of the first aspect, in a seventh possible implementation of the first aspect, the method further includes:

obtaining, by the eNB, a multi-input multi-output MIMO transmission mode of the terminal; and setting, by the eNB, the third preset range according to the transmission mode.

According to a second aspect, the present disclosure provides a network resource allocation apparatus, where the apparatus includes:

a receiving module, configured to receive a channel quality indicator CQI sent by a terminal;

a first obtaining module, configured to obtain a first MCS of the terminal according to the CQI;

an allocation module, configured to allocate, according to an amount of to-be-transmitted data and the first MCS, to the terminal a first resource block RB set required for transmitting the to-be-transmitted data; and an adjustment module, configured to adjust the first RB set according to a service type of the to-be-transmitted data and the first MCS.

With reference to the second aspect, in a first possible implementation of the second aspect, the adjustment module includes:

a first obtaining unit, configured to: when the service type of the to-be-transmitted data is a voice service type and the first MCS is within a first preset range, obtain transmit power of an idle RB in a cell that the terminal accesses; and an increment unit, configured to increase transmit power of each RB in the first RB set according to the transmit power of the idle RB.

With reference to the first possible implementation of the second aspect, in a second possible implementation of the second aspect, the increment unit includes:

a first allocation subunit, configured to equally allocate a preset value to the RBs in the first RB set if the transmit power of the idle RB is greater than the preset value; or a second allocation subunit, configured to equally allocate the transmit power of the idle RB to the RBs in the first RB set if the transmit power of the idle RB is not greater than a preset value.

With reference to the second aspect, in a third possible implementation of the second aspect, the adjustment module includes:

a first adjustment unit, configured to: when the service type of the to-be-transmitted data is a data service type, adjust, according to the first MCS, a quantity of RBs included in the first RB set to obtain multiple second RB sets, where a sum of transmit power of RBs in the first RB set is equal to a sum of transmit power of RBs in each second RB set of the multiple second RB sets;

a calculation unit, configured to separately calculate a throughput of the terminal in each second RB set; and a second adjustment unit, configured to adjust the first RB set according to a second RB set corresponding to a maximum throughput.

With reference to the third possible implementation of the second aspect, in a fourth possible implementation of the second aspect, the first adjustment unit includes:

a reduction subunit, configured to: if the first MCS is within a second preset range, reduce the quantity of RBs included in the first RB set to obtain multiple second RB sets; or an increment subunit, configured to: if the first MCS is within a third preset range, increase the quantity of RBs included in the first RB set to obtain multiple second RB sets.

With reference to the third possible implementation of the second aspect, in a fifth possible implementation of the second aspect, the calculation unit includes:

a first calculation subunit, configured to separately calculate, according to the first MCS, transmit power of each RB in each second RB set, and transmit power of each RB in the first RB set, a second MCS corresponding to each second RB set; and a second calculation subunit, configured to separately calculate the throughput of the terminal in each second RB set according to each second RB set and the second MCS corresponding to each second RB set.

With reference to the third possible implementation of the second aspect, in a sixth possible implementation of the second aspect, the second adjustment unit includes:

an obtaining subunit, configured to obtain the second RB set corresponding to the maximum throughput; and an adjustment subunit, configured to adjust the first RB set to the second RB set corresponding to the maximum throughput.

With reference to the fourth possible implementation of the second aspect, in a seventh possible implementation of the second aspect, the apparatus further includes:

a second obtaining module, configured to obtain a multi-input multi-output MIMO transmission mode of the terminal; and a setting module, configured to set the third preset range according to the transmission mode.

According to a third aspect, the present disclosure provides a base station, where the base station includes a receiver and a processor;

the receiver is configured to receive a channel quality indicator CQI sent by a terminal;

the processor is configured to obtain a first MCS of the terminal according to the CQI;

the processor is further configured to allocate, according to an amount of to-be-transmitted data and the first MCS, to the terminal a first resource block RB set required for transmitting the to-be-transmitted data; and the processor is further configured to adjust the first RB set according to a service type of the to-be-transmitted data and the first MCS.

With reference to the third aspect, in a first possible implementation of the third aspect, the processor is further configured to: when the service type of the to-be-transmitted data is a voice service type and the first MCS is within a first preset range, obtain transmit power of an idle RB in a cell that the terminal accesses, and increase transmit power of each RB in the first RB set according to the transmit power of the idle RB.

With reference to the first possible implementation of the third aspect, in a second possible implementation of the third aspect, the processor is further configured to equally allocate a preset value to the RBs in the first RB set if the transmit power of the idle RB is greater than the preset value; or the processor is further configured to equally allocate the transmit power of the idle RB to the RBs in the first RB set if the transmit power of the idle RB is not greater than a preset value.

With reference to the third aspect, in a third possible implementation of the third aspect, the processor is further configured to: when the service type of the to-be-transmitted data is a data service type, adjust, according to the first MCS, a quantity of RBs included in the first RB set to obtain multiple second RB sets, where a sum of transmit power of RBs in the first RB set is equal to a sum of transmit power of RBs in each second RB set of the multiple second RB sets; separately calculate a throughput of the terminal in each second RB set; and adjust the first RB set according to a second RB set corresponding to a maximum throughput.

With reference to the third possible implementation of the third aspect, in a fourth possible implementation of the third aspect, the processor is further configured to: if the first MCS is within a second preset range, reduce the quantity of RBs included in the first RB set to obtain multiple second RB sets; or the processor is further configured to: if the first MCS is within a third preset range, increase the quantity of RBs included in the first RB set to obtain multiple second RB sets.

With reference to the third possible implementation of the third aspect, in a fifth possible implementation of the third aspect, the processor is further configured to separately calculate, according to the first MCS, transmit power of each RB in each second RB set, and transmit power of each RB in the first RB set, a second MCS corresponding to each second RB set, and separately calculate the throughput of the terminal in each second RB set according to each second RB set and the second MCS corresponding to each second RB set.

With reference to the third possible implementation of the third aspect, in a sixth possible implementation of the third aspect, the processor is further configured to obtain the second RB set corresponding to the maximum throughput, and adjust the first RB set to the second RB set corresponding to the maximum throughput.

With reference to the fourth possible implementation of the third aspect, in a seventh possible implementation of the third aspect, the processor is further configured to obtain a multi-input multi-output MIMO transmission mode of the terminal; and the processor is further configured to set the third preset range according to the transmission mode.

In the present disclosure, an eNB receives a channel quality indicator CQI sent by a terminal, obtains a first MCS of the terminal according to the CQI, allocates, according to an amount of to-be-transmitted data and the first MCS, the terminal a first resource block RB set required for transmitting the to-be-transmitted data, and adjusts the first RB set according to a service type of the to-be-transmitted data and the first MCS. Because different service types require different transmit power of each RB, adjusting the transmit power of each RB according to a service type can improve efficiency in transmitting the to-be-transmitted data.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
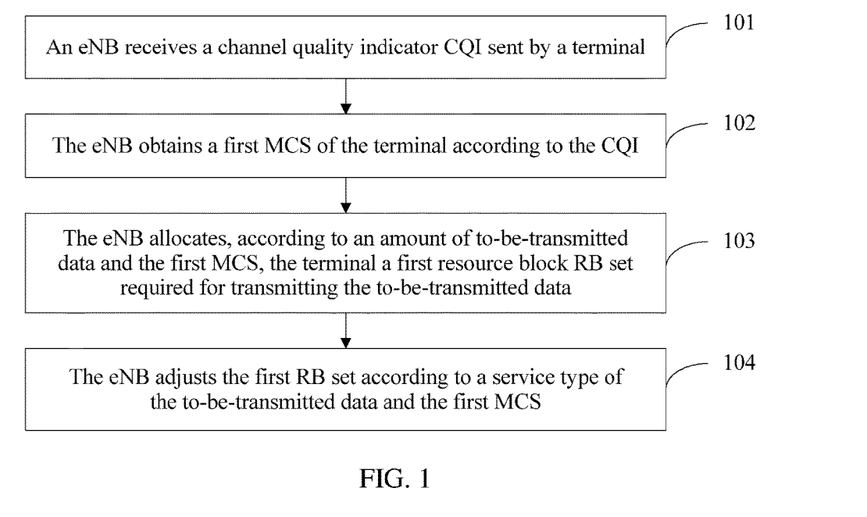
FIG. 1 is a flowchart of a network resource allocation method according to an embodiment of the present disclosure.

An embodiment of the present disclosure provides a network resource allocation method. Referring to FIG. 1, the method includes:

Step 101: An eNB receives a channel quality indicator (CQI) sent by a terminal.

Step 102: The eNB obtains a first MCS of the terminal according to the CQI.

Step 103: The eNB allocates, according to an amount of to-be-transmitted data and the first MCS, the terminal a first resource block RB set required for transmitting the to-be-transmitted data.

Step 104: The eNB adjusts the first RB set according to a service type of the to-be-transmitted data and the first MCS.

In this embodiment of the present disclosure, after allocating a terminal a first RB set required for transmitting to-be-transmitted data, an eNB adjusts the first RB set according to a service type of the to-be-transmitted data and a first MCS. Because different service types require different transmit power of each RB, adjusting the transmit power of each RB according to a service type can improve efficiency in transmitting the to-be-transmitted data.

An embodiment of the present disclosure provides a network resource allocation method. When a base station sends to-be-transmitted data to a terminal, the base station may allocate the terminal a network resource according to the network resource allocation method provided in this embodiment of the present disclosure, and the network resource may be transmit power, an RB, and the like.

Figure 2:
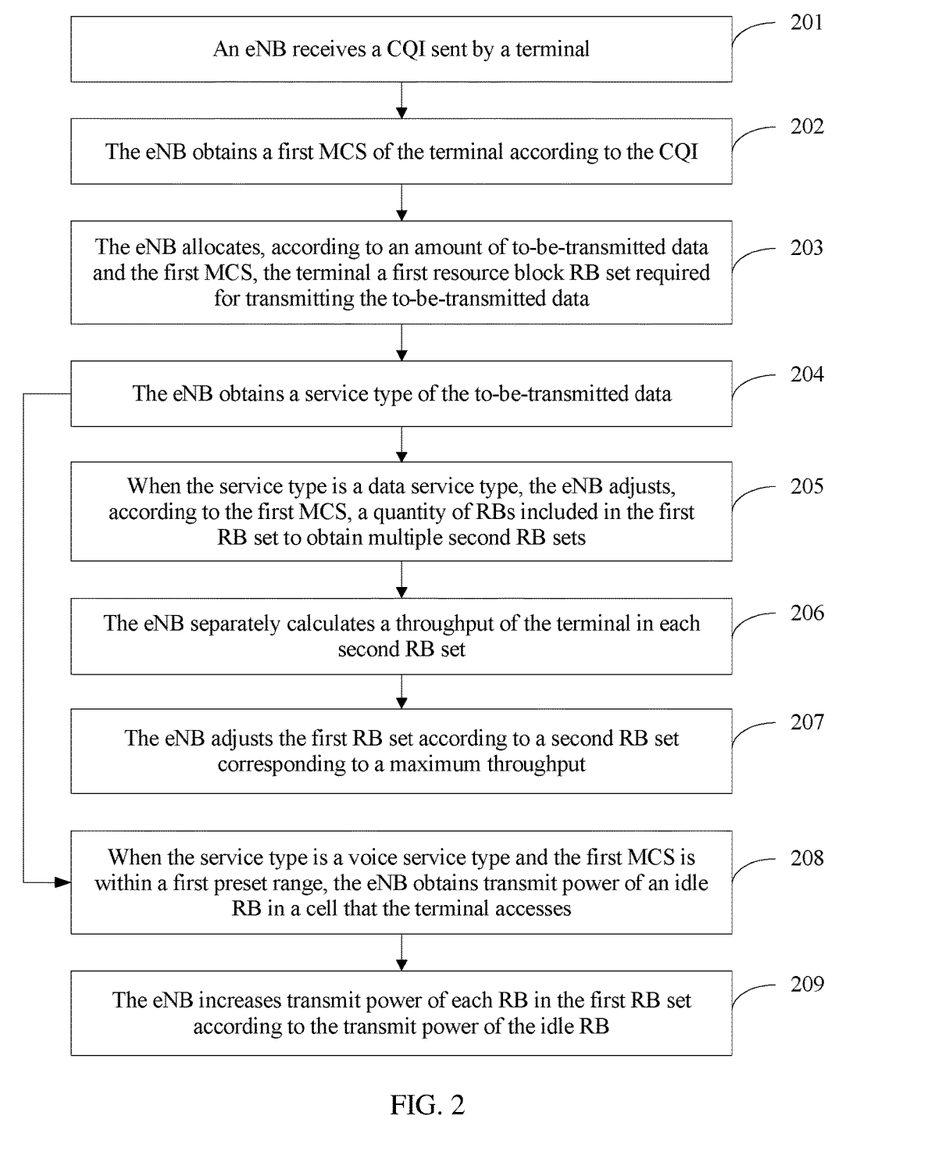
FIG. 2 is a flowchart of a network resource allocation method according to an embodiment of the present disclosure.

Referring to FIG. 2, the method includes the following steps.

Step 201: An eNB receives a CQI sent by a terminal.

When the terminal obtains data from the base station that the terminal accesses, the terminal sends the CQI to the eNB, and the eNB receives the CQI sent by the terminal.

Step 202: The eNB obtains a first MCS of the terminal according to the CQI.

The eNB obtains the first MCS of the terminal from a correspondence between a CQI and an MCS according to the CQI.

It should be noted that the correspondence between a CQI and an MCS is pre-stored in the base station.

In a downlink of LTE, the base station delivers reference signal power and a p-a value to the terminal by using radio resource control (RRC) signaling. p-a is a power offset of a data signal relative to a reference signal, and the terminal demodulates to-be-transmitted data according to the reference signal power and the p-a value. Adjusting transmit power of each RB on a base station side is equivalent to adjusting the p-a value, Therefore, the base station allocates, according to the network resource allocation method provided in this embodiment of the present disclosure, a network resource to a terminal that does not need to modulate and demodulate the to-be-transmitted data according to the p-a value.

The terminal that does not need to modulate and demodulate the to-be-transmitted data according to the p-a value includes: a terminal whose multiple-input multiple-output (MIMO) transmission mode is a transmission mode in which channel estimation is performed based on a cell-specific reference signal (CRS), and whose modulation scheme is quadrature phase shift keying (QPSK), or a terminal whose MIMO transmission mode is a transmission mode in which channel estimation is performed based on a demodulation reference signal (DRS), and whose modulation scheme is QPSK and quadrature amplitude modulation (QAM).

Step 203: The eNB allocates, according to an amount of to-be-transmitted data and the first MCS, the terminal a first resource block RB set required for transmitting the to-be-transmitted data.

Before this step, the eNB obtains a quantity of RBs included in a cell that the terminal accesses, equally allocates transmit power corresponding to the cell to RBs according to the quantity of RBs, and stores transmit power of each RB.

In this step, the eNB obtains, according to the amount of the to-be-transmitted data and the first MCS, a quantity of RBs required for transmitting the to-be-transmitted data from a correspondence among a data amount, an MCS, and a quantity of RBs, allocates the terminal RBs whose quantity is equal to the quantity of RBs required for transmitting the to-be-transmitted data, and establishes the first RB set by using the allocated RBs.

It should be noted that the correspondence among a data amount, an MCS, and a quantity of RBs is pre-stored in the eNB.

For example, the eNB allocates the terminal four RBs according to the amount of the to-be-transmitted data and the first MCS, and transmit power of each RB is 5 dbm; therefore the first RB set includes four RBs, and transmit power of each RB is 5 dbm.

Step 204: The eNB obtains a service type of the to-be-transmitted data; and when the service type is a data service type, performs step 205; or when the service type is a voice service type, performs step 208.

The step that the eNB obtains a service type of the to-be-transmitted data may be:

If the CQI is a CQI corresponding to the voice service type, the eNB determines that the service type of the to-be-transmitted data is the voice service type; or if the CQI is a CQI corresponding to the data service type, the eNB determines that the service type of the to-be-transmitted data is the data service type.

For example, the CQI corresponding to the voice service type is 1 or 5, and the CQI corresponding to the data service type is another value different from 1 and 5. If the CQI is 1 or 5, the eNB determines that the service type of the to-be-transmitted data is the voice service type; or if the CQI is not 1 or 5, the eNB determines that the service type of the to-be-transmitted data is the data service type.

Step 205: When the service type is the data service type, the eNB adjusts, according to the first MCS, a quantity of RBs included in the first RB set to obtain multiple second RB sets.

A sum of transmit power of RBs in the first RB set is equal to a sum of transmit power of RBs in each second RB set of the multiple second RB sets.

The step that the eNB adjusts, according to the first MCS, a quantity of RBs included in the first RB set to obtain multiple second RB sets may be:

If the first MCS is within a second preset range, the eNB reduces the quantity of RBs included in the first RB set to obtain multiple second RB sets; or if the first MCS is within a third preset range, the eNB increases the quantity of RBs included in the first RB set to obtain multiple second RB sets.

If the first MCS is within the second preset range, the eNB, by using a resource block group (RBG) as a granularity, reduces the quantity of RBs included in the first RB set until the quantity of RBs included in the first RB set is less than or equal to a quantity of RBs included in one RBG, and then the eNB establishes a second RB set by using the RBs included in the first RB set to obtain multiple second RB sets. The eNB equally allocates transmit power of reduced RBs in the first RB set to RBs in the second RB sets.

The second preset range may be set or changed as required, and the second preset range is not limited specifically in this embodiment of the present disclosure. For example, the second preset range is [0, 6].

For example, if the first MCS is within the second preset range, one RBG includes two RBs, the first RB set includes six RBs, and transmit power of each RB in the first RB set is 4 dbm, the eNB reduces two RBs from the first RB set for the first time to obtain a second RB set including four RBs, and equally allocates transmit power (8 dbm) of the two reduced RBs to the four RBs included in the second RB set. In this case, transmit power of each RB in the second RB set is 6 dbm. If the eNB reduces four RBs from the first RB set for the second time to obtain a second RB set including two RBs, and equally allocates transmit power (16 dbm) of the four reduced RBs to the two RBs included in the second RB set. In this case, transmit power of each RB in the second RB set is 12 dbm.

If the first MCS is within the third preset range, the eNB, by using the RBG as a granularity, increases the quantity of RBs included in the first RB set to obtain multiple second RB sets.

When the first MCS is within the third preset range, the eNB, by using the RBG as a granularity, increases the quantity of RBs included in the first RB set until a quantity of idle RBs in a cell that the terminal accesses is less than or equal to the quantity of RBs included in one RBG, and then the eNB establishes a second RB set by using remaining RBs in the first RB set and equally allocates transmit power of RBs in the first RB set to RBs in the second RB set.

The third preset range may be set according to a multiple-input multiple-output (MIMO) transmission mode of the terminal, and the method further includes:

The eNB obtains the MIMO transmission mode of the terminal and sets the third preset range according to the transmission mode.

If the transmission mode is a transmission mode in which channel estimation is performed based on a cell-specific reference signal (CRS), the third preset range is (6, 9]; or if the transmission mode is a transmission mode in which channel estimation is performed based on a demodulation reference signal (DRS), the third preset range is (6, 28].

The step of obtaining the MIMO transmission mode of the terminal may be:

obtaining a terminal identifier of the terminal and obtaining the MIMO transmission mode of the terminal from a correspondence between a terminal identifier and a MIMO transmission mode according to the terminal identifier of the terminal.

Before this step, the base station receives a terminal identifier and a MIMO transmission mode, of each terminal that accesses the base station, sent by the terminal, and stores the terminal identifier and the MIMO transmission mode of each terminal in the correspondence between a terminal identifier and a MIMO transmission mode.

The terminal identifier may be a globally unique identifier (GUID) of a terminal, a phone number corresponding to a terminal, or the like. The terminal identifier is not specifically limited in this embodiment of the present disclosure.

Step 206: The eNB separately calculates a throughput of the terminal in each second RB set.

This step may be implemented by using the following steps (1) and (2), including:

(1) The eNB separately calculates, according to the first MCS, transmit power of each RB in each second RB set, and transmit power of each RB in the first RB set, a second MCS corresponding to each second RB set.

Step (1) may be implemented by using the following steps (1-1) to (1-3), including:

(1-1) The eNB obtains a first signal to interference plus noise ratio (Signal to Interference plus Noise Ratio, SINR) of the terminal according to the first MCS.

The eNB obtains the first SINR of the terminal from a correspondence between an MCS and an SINR according to the first MCS.

It should be noted that the correspondence between an MCS and an SINR is pre-stored in the eNB.

(1-2) The eNB separately calculates, according to the first SINR, the transmit power of each RB in each second RB set, and the transmit power of each RB in the first RB set, a second SINR corresponding to each second RB set.

The second SINR corresponding to each second RB set may be obtained by means of calculation according to the following formula (1) in this step:

$$\text{sinrAdjust} = \text{SinrBase} + \text{lintodbm}(\text{PowerAdjust}) - \text{Lintodbm}(\text{PowerperRb}) \quad (1)$$

sinrAdjust is the second SINR, SinrBase is the first SINR, PowerAdjust is the transmit power of each RB in the second RB set, and powerPerRb is the transmit power of each RB in the first RB set.

PowerAdjust=(powerPerRb*RbBase)/RbAdjust, where RbBase is the quantity of RBs included in the first RB set, and RbAdjust is the quantity of RBs included in the second RB set.

(1-3) The eNB obtains, according to the second SINR corresponding to each second RB set, the second MCS corresponding to each second RB set.

The eNB obtains, according to the second SINR corresponding to each second RB set, the second MCS corresponding to each second RB set from the correspondence between an SINR and an MCS.

(2) The eNB separately calculates the throughput of the terminal in each second RB set according to each second RB set and the second MCS corresponding to each second RB set.

The eNB obtains a quantity of RBs included in each second RB set, and obtains the throughput of the terminal in each second RB set from a correspondence among an MCS, a quantity of RBs, and a throughput according to the quantity of RBs included in each second RB set.

It should be noted that the correspondence among an MCS, a quantity of RBs, and a throughput is pre-stored in the eNB.

Further, the eNB obtains a throughput of the terminal in first RB set according to the first MCS and the quantity of RBs included in the first RB set.

Step 207: The eNB adjusts the first RB set according to a second RB set corresponding to a maximum throughput, and the process ends.

The eNB selects the maximum throughput from the throughputs of the terminal in all the second RB sets, obtains the second RB set corresponding to the maximum throughput, and adjusts the first RB set to the second RB set corresponding to the maximum throughput.

The step of adjusting the first RB set to the second RB set corresponding to the maximum throughput may be:

adjusting the quantity of RBs included in the first RB set to a quantity of RBs included in the second RB set corresponding to the maximum throughput, and adjusting the transmit power of each RB in the first RB set to transmit power of each RB in the second RB set corresponding to the maximum throughput.

Further, before step 207 is performed, whether the maximum throughput is greater than the throughput of the terminal in the first RB set is determined, and if the maximum throughput is greater than the throughput of the terminal in the first RB set, step 207 is performed; or if the maximum throughput is not greater than the throughput of the terminal in the first RB set, the first RB set is not adjusted.

Step 208: When the service type is a voice service type and the first MCS is within a first preset range, the eNB obtains transmit power of an idle RB in a cell that the terminal accesses.

When the service type is a voice service type, the eNB determines whether the first MCS is within the first preset range, and if the first MCS is within the first preset range, the eNB obtains a quantity of idle RBs in the cell that the terminal accesses, and obtains transmit power of the idle RBs according to the quantity of idle RBs and transmit power of each RB.

For example, if the quantity of idle RBs in the cell is 2 and transmit power of each RB is 5 dbm, transmit power of the idle RBs in the cell is 10 dbm.

The first preset range may be set or changed as required, and the first preset range is not limited specifically in this embodiment of the present disclosure. For example, the first preset range is [0, 1].

If the first MCS is not within the first preset range, the eNB does not adjust the transmit power of each RB in the first RB set, and the process ends.

Further, the base station may adjust, according to the method provided in this step, the transmit power of each RB in the first RB set only for a terminal whose reference signal received power (RSRP) is greater than a preset threshold, and for a terminal whose RSRP is not greater than the preset threshold, does not adjust the transmit power of each RB in the first RB set.

This step may be further: obtaining RSRP of the terminal and determining whether the RSRP of the terminal is greater than the preset threshold, where if the RSRP of the terminal is greater than the preset threshold, the eNB obtains the transmit power of the idle RB in the cell that the terminal accesses; or if the RSRP of the terminal is not greater than the preset threshold, the process ends.

The preset threshold may be set or changed as required, and the preset threshold is not limited specifically in this embodiment of the present disclosure.

Step 209: The eNB increases transmit power of each RB in the first RB set according to the transmit power of the idle RB.

Whether the transmit power of the idle RB is greater than a preset value is determined, and if the transmit power of the idle RB is greater than the preset value, the eNB equally allocates the preset value to the RBs in the first RB set; or if the transmit power of the idle RB is not greater than the preset value, the eNB equally allocates the transmit power of the idle RB to the RBs in the first RB set.

The preset value may be set or changed as required, and the preset value is not limited specifically in this embodiment of the present disclosure. For example, the preset value is 4 dbm.

For example, the preset value is 4 dbm, the transmit power of the idle RB is 10 dbm, the first RB set includes four RBs, and transmit power of each RB is 5 dbm. Because the transmit power of the idle RB is greater than the preset value, the eNB equally allocates the preset value to the RBs in the first RB set, that is, equally allocates 4 dbm to the four RBs included in the first RB set, and therefore transmit power of each RB in an adjusted first RB set is 5 dbm.

Further, after adjusting the first RB set, the base station sends to-be-transmitted data to the terminal by using the adjusted first RB set.

In this embodiment of the present disclosure, after allocating a terminal a first RB set required for transmitting to-be-transmitted data, an eNB adjusts the first RB set according to a service type of the to-be-transmitted data and a first MCS. Because different service types require different transmit power of each RB, adjusting the transmit power of each RB according to a service type can improve efficiency in transmitting the to-be-transmitted data.

Figure 3:
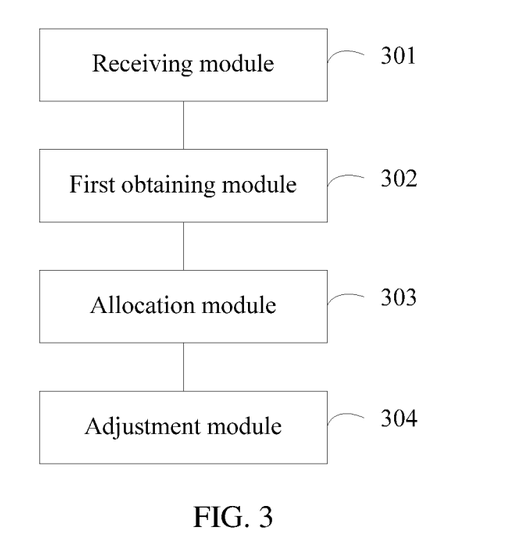
FIG. 3 is a schematic structural diagram of a network resource allocation apparatus according to an embodiment of the present disclosure.

An embodiment of the present disclosure provides a network resource allocation apparatus, and the apparatus is configured to perform the foregoing network resource allocation method. Referring to FIG. 3, the apparatus includes:

a receiving module 301, configured to receive a channel quality indicator CQI sent by a terminal;

a first obtaining module 302, configured to obtain a first MCS of the terminal according to the CQI;

an allocation module 303, configured to allocate, according to an amount of to-be-transmitted data and the first MCS, to the terminal a first resource block RB set required for transmitting the to-be-transmitted data; and an adjustment module 304, configured to adjust the first RB set according to a service type of the to-be-transmitted data and the first MCS.

Further, the adjustment module 304 includes:

a first obtaining unit, configured to: when the service type of the to-be-transmitted data is a voice service type and the first MCS is within a first preset range, obtain transmit power of an idle RB in a cell that the terminal accesses; and an increment unit, configured to increase transmit power of each RB in the first RB set according to the transmit power of the idle RB.

Further, the increment unit includes:

a first allocation subunit, configured to equally allocate a preset value to the RBs in the first RB set if the transmit power of the idle RB is greater than the preset value; or a second allocation subunit, configured to equally allocate the transmit power of the idle RB to the RBs in the first RB set if the transmit power of the idle RB is not greater than a preset value.

Further, the adjustment module 304 includes:

a first adjustment unit, configured to: when the service type of the to-be-transmitted data is a data service type, adjust, according to the first MCS, a quantity of RBs included in the first RB set to obtain multiple second RB sets, where a sum of transmit power of RBs in the first RB set is equal to a sum of transmit power of RBs in each second RB set of the multiple second RB sets;

a calculation unit, configured to separately calculate a throughput of the terminal in each second RB set; and a second adjustment unit, configured to adjust the first RB set according to a second RB set corresponding to a maximum throughput.

Further, the first adjustment unit includes:

a reduction subunit, configured to: if the first MCS is within a second preset range, reduce the quantity of RBs included in the first RB set to obtain multiple second RB sets; or an increment subunit, configured to: if the first MCS is within a third preset range, increase the quantity of RBs included in the first RB set to obtain multiple second RB sets.

Further, the calculation unit includes:

a first calculation subunit, configured to separately calculate, according to the first MCS, transmit power of each RB in each second RB set, and transmit power of each RB in the first RB set, a second MCS corresponding to each second RB set; and a second calculation subunit, configured to separately calculate the throughput of the terminal in each second RB set according to each second RB set and the second MCS corresponding to each second RB set.

Further, the second adjustment unit includes:

an obtaining subunit, configured to obtain the second RB set corresponding to the maximum throughput; and an adjustment subunit, configured to adjust the first RB set to the second RB set corresponding to the maximum throughput.

Further, the apparatus further includes:

a second obtaining module, configured to obtain a multi-input multi-output MIMO transmission mode of the terminal; and a setting module, configured to set the third preset range according to the transmission mode.

In this embodiment of the present disclosure, after allocating a terminal a first RB set required for transmitting to-be-transmitted data, an eNB adjusts the first RB set according to a service type of the to-be-transmitted data and a first MCS. Because different service types require different transmit power of each RB, adjusting the transmit power of each RB according to a service type can improve efficiency in transmitting the to-be-transmitted data.

Figure 4:
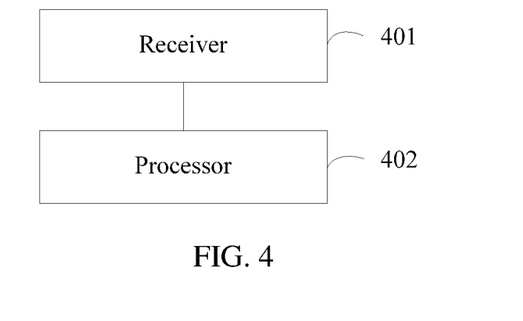
FIG. 4 is a schematic structural diagram of a base station according to an embodiment of the present disclosure.

An embodiment of the present disclosure provides a base station, and the base station is configured to perform the foregoing network resource allocation method. Referring to FIG. 4, the base station includes: a receiver 401 and a processor 402;

the receiver 401 is configured to receive a channel quality indicator CQI sent by a terminal;

the processor 402 is configured to obtain a first MCS of the terminal according to the CQI;

the processor 402 is further configured to allocate, according to an amount of to-be-transmitted data and the first MCS, to the terminal a first resource block RB set required for transmitting the to-be-transmitted data; and the processor 402 is further configured to adjust the first RB set according to a service type of the to-be-transmitted data and the first MCS.

Further, the processor 402 is further configured to: when the service type of the to-be-transmitted data is a voice service type and the first MCS is within a first preset range, obtain transmit power of an idle RB in a cell that the terminal accesses, and increase transmit power of each RB in the first RB set according to the transmit power of the idle RB.

Further, the processor 402 is further configured to equally allocate a preset value to the RBs in the first RB set if the transmit power of the idle RB is greater than the preset value; or the processor 402 is further configured to equally allocate the transmit power of the idle RB to the RBs in the first RB set if the transmit power of the idle RB is not greater than a preset value.

Further, the processor 402 is further configured to: when the service type of the to-be-transmitted data is a data service type, adjust, according to the first MCS, a quantity of RBs included in the first RB set to obtain multiple second RB sets, where a sum of transmit power of RBs in the first RB set is equal to a sum of transmit power of RBs in each second RB set of the multiple second RB sets; separately calculate a throughput of the terminal in each second RB set; and adjust the first RB set according to a second RB set corresponding to a maximum throughput.

Further, the processor 402 is further configured to: if the first MCS is within a second preset range, reduce the quantity of RBs included in the first RB set to obtain multiple second RB sets; or the processor 402 is further configured to: if the first MCS is within a third preset range, increase the quantity of RBs included in the first RB set to obtain multiple second RB sets.

Further, the processor 402 is further configured to separately calculate, according to the first MCS, transmit power of each RB in each second RB set, and transmit power of each RB in the first RB set, a second MCS corresponding to each second RB set, and separately calculate the throughput of the terminal in each second RB set according to each second RB set and the second MCS corresponding to each second RB set.

Further, the processor 402 is further configured to obtain the second RB set corresponding to the maximum throughput, and adjust the first RB set to the second RB set corresponding to the maximum throughput.

Further, the processor 402 is further configured to obtain a multi-input multi-output MIMO transmission mode of the terminal; and the processor 402 is further configured to set the third preset range according to the transmission mode.

In this embodiment of the present disclosure, after allocating a terminal a first RB set required for transmitting to-be-transmitted data, an eNB adjusts the first RB set according to a service type of the to-be-transmitted data and a first MCS. Because different service types require different transmit power of each RB, adjusting the transmit power of each RB according to a service type can improve efficiency in transmitting the to-be-transmitted data.

It should be noted that when the network resource allocation apparatus provided in the foregoing embodiments allocates a network resource, division of the foregoing function modules is merely used as an example for illustration. In actual application, the foregoing functions may be allocated to different function modules and implemented according to a requirement, that is, an inner structure of the apparatus is divided into different function modules to implement all or apart of the functions described above. In addition, the network resource allocation apparatus provided in the foregoing embodiments pertains to a same concept as the network resource allocation method embodiments. For a specific implementation process, refer to the method embodiments, and details are not described herein.

A person of ordinary skill in the art may understand that all or a part of the steps of the embodiments may be implemented by hardware or a program instructing related hardware. The program may be stored in a computer readable storage medium. The foregoing storage medium may be a read-only memory, a magnetic disk, an optical disc, or the like.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A network resource allocation method, comprising:
receiving, by an evolved NodeB (eNB), a channel quality indicator (CQI) sent by a terminal;
obtaining, by the eNB, a first modulation and coding scheme (MCS) of the terminal according to the CQI;
allocating, by the eNB according to an amount of to-be-transmitted data and the first MCS, to the terminal a first resource block (RB) set required for transmitting the to-be-transmitted data;
adjusting, by the eNB, the first RB set according to a service type of the to-be-transmitted data and the first MCS, including:
when the service type of the to-be-transmitted data is a voice service type and the first MCS is within a first preset range, obtaining, by the eNB, transmit power of an idle RB in a cell that the terminal accesses; and
increasing, by the eNB, transmit power of each RB in the first RB set according to the transmit power of the idle RB; and
communicating, by the eNB, according to the first RB set.

2. The method according to claim 1, wherein increasing, by the eNB, transmit power of each RB in the first RB set according to the transmit power of the idle RB comprises:
equally allocating, by the eNB, a first preset value to the RBs in the first RB set if the transmit power of the idle RB is greater than the first preset value; or
equally allocating, by the eNB, the transmit power of the idle RB to the RBs in the first RB set if the transmit power of the idle RB is not greater than a second preset value.

3. A network resource allocation method, comprising:
receiving, by an evolved NodeB (eNB), a channel quality indicator (CQI) sent by a terminal;
obtaining, by the eNB, a first modulation and coding scheme (MCS) of the terminal according to the CQI;
allocating, by the eNB according to an amount of to-be-transmitted data and the first MCS, to the terminal a first resource block (RB) set required for transmitting the to-be-transmitted data;
adjusting, by the eNB, the first RB set according to a service type of the to-be-transmitted data and the first MCS, including:
when the service type of the to-be-transmitted data is a data service type, adjusting, by the eNB according to the first MCS, a quantity of RBs comprised in the first RB set to obtain multiple second RB sets, wherein a sum of transmit power of RBs in the first RB set is equal to a sum of transmit power of RBs in each second RB set of the multiple second RB sets;
separately calculating, by the eNB, a throughput of the terminal in each second RB set; and
adjusting, by the eNB, the first RB set according to a second RB set corresponding to a maximum throughput of the calculated throughputs; and
communicating, by the eNB, according to the first RB set.

4. The method according to claim 3, wherein adjusting, by the eNB according to the first MCS, a quantity of RBs comprised in the first RB set to obtain multiple second RB sets comprises:
if the first MCS is within a second preset range, reducing, by the eNB, the quantity of RBs comprised in the first RB set to obtain multiple second RB sets; or
if the first MCS is within a third preset range, increasing, by the eNB, the quantity of RBs comprised in the first RB set to obtain multiple second RB sets.

5. The method according to claim 3, wherein separately calculating, by the eNB, a throughput of the terminal in each second RB set comprises:
separately calculating, by the eNB according to the first MCS, transmit power of each RB in each second RB set, and transmit power of each RB in the first RB set, a second MCS corresponding to each second RB set; and
separately calculating, by the eNB, the throughput of the terminal in each second RB set according to each second RB set and the second MCS corresponding to each second RB set.

6. The method according to claim 3, wherein adjusting, by the eNB, the first RB set according to a second RB set corresponding to a maximum throughput comprises:
obtaining, by the eNB, the second RB set corresponding to the maximum throughput; and
adjusting, by the eNB, the first RB set to the second RB set corresponding to the maximum throughput.

7. The method according to claim 4, further comprising:
obtaining, by the eNB, a multi-input multi-output (MIMO) transmission mode of the terminal; and
setting, by the eNB, the third preset range according to the transmission mode.

8. A base station, comprising:
a receiver configured to receive a channel quality indicator (CQI) sent by a terminal;
a processor configured to:
obtain a first modulation and coding scheme (MCS) of the terminal according to the CQI,
allocate, according to an amount of to-be-transmitted data and the first MCS, to the terminal a first resource block (RB) set required for transmitting the to-be-transmitted data,
adjust the first RB set according to a service type of the to-be-transmitted data and the first MCS;
when the service type of the to-be-transmitted data is a voice service type and the first MCS is within a first preset range, obtain transmit power of an idle RB in a cell that the terminal accesses;
increase transmit power of each RB in the first RB set according to the transmit power of the idle RB; and
communicate according to the first RB set.

9. The base station according to claim 8, wherein the processor is further configured to:
equally allocate a first preset value to the RBs in the first RB set if the transmit power of the idle RB is greater than the first preset value; or
equally allocate the transmit power of the idle RB to the RBs in the first RB set if the transmit power of the idle RB is not greater than a second preset value.

10. A base station, comprising:
a receiver configured to receive a channel quality indicator (CQI) sent by a terminal;
a processor configured to:
obtain a first modulation and coding scheme (MCS) of the terminal according to the CQI,
allocate, according to an amount of to-be-transmitted data and the first MCS, to the terminal a first resource block (RB) set required for transmitting the to-be-transmitted data,
adjust the first RB set according to a service type of the to-be-transmitted data and the first MCS;
when the service type of the to-be-transmitted data is a data service type, adjust, according to the first MCS, a quantity of RBs comprised in the first RB set to obtain multiple second RB sets, wherein a sum of transmit power of RBs in the first RB set is equal to a sum of transmit power of RBs in each second RB set of the multiple second RB sets;
separately calculate a throughput of the terminal in each second RB set; and
adjust the first RB set according to a second RB set corresponding to a maximum throughput of the calculated throughputs; and
communicate according to the first RB set.

11. The base station according to claim 10, wherein the processor is further configured to:
if the first MCS is within a second preset range, reduce the quantity of RBs comprised in the first RB set to obtain multiple second RB sets; or
if the first MCS is within a third preset range, increase the quantity of RBs comprised in the first RB set to obtain multiple second RB sets.

12. The base station according to claim 10, wherein the processor is further configured to:
separately calculate, according to the first MCS, transmit power of each RB in each second RB set, and transmit power of each RB in the first RB set, a second MCS corresponding to each second RB set; and
separately calculate the throughput of the terminal in each second RB set according to each second RB set and the second MCS corresponding to each second RB set.

13. The base station according to claim 10, wherein the processor is further configured to:
obtain the second RB set corresponding to the maximum throughput; and
adjust the first RB set to the second RB set corresponding to the maximum throughput.

14. The base station according to claim 11, wherein the processor is further configured to:
obtain a multi-input multi-output MIMO transmission mode of the terminal; and
set the third preset range according to the transmission mode.

* * * * *